US011889580B2

(12) United States Patent
Speight et al.

(10) Patent No.: US 11,889,580 B2
(45) Date of Patent: Jan. 30, 2024

(54) WIRELESS COMMUNICATION UNITS AND WIRELESS COMMUNICATION SYSTEM AND METHODS TO SUPPORT BEACON TECHNOLOGY

(71) Applicant: Veea Systems Ltd., Bath (GB)

(72) Inventors: Timothy James Speight, Monmouthshire (GB); Allen Salmasi, New York, NY (US)

(73) Assignee: VEEA Inc., New York, NY (US)

( * ) Notice: Subject to any disclaimer, the term of this patent is extended or adjusted under 35 U.S.C. 154(b) by 71 days.

(21) Appl. No.: 17/380,973

(22) Filed: Jul. 20, 2021

(65) Prior Publication Data

US 2021/0352463 A1    Nov. 11, 2021

Related U.S. Application Data

(63) Continuation-in-part of application No. 15/373,202, filed on Dec. 8, 2016, now abandoned.

(51) Int. Cl.
*H04W 8/00* (2009.01)
*H04W 4/80* (2018.01)

(52) U.S. Cl.
CPC .............. *H04W 8/005* (2013.01); *H04W 4/80* (2018.02)

(58) Field of Classification Search
CPC ....... H04W 8/005; H04W 4/80; H04W 84/18; H04W 48/14; H04W 52/0229; H04W 4/021; Y02D 30/70
See application file for complete search history.

(56) References Cited

U.S. PATENT DOCUMENTS

2003/0191818 A1\* 10/2003 Rankin ................... H04L 67/04
                                                          709/219
2014/0378058 A1  12/2014 Decuir
                              (Continued)

FOREIGN PATENT DOCUMENTS

CN           105792317         7/2016

OTHER PUBLICATIONS

European Patent Office No. 17205102.1-1213; Communication Pursuant to Article 94(3) EPC; dated Nov. 24, 2022; 4 Pages.
(Continued)

*Primary Examiner* — Marcos L Torres
(74) *Attorney, Agent, or Firm* — FITCH EVEN TABIN & FLANNERY, LLP

(57) ABSTRACT

A beacon device for communicating with at least one discovering device is described. The beacon device comprises: a transceiver that is configured to obtain content from a remote server using a first wireless technology or a wireline technology; a second transmitter configured to transmit at least a beacon indicator on a second wireless technology; a second receiver configured to receive a first message from the discovering device in response to the beacon indicator on the second wireless technology requesting information relating to the beacon indicator; a controller operably coupled to the second receiver and configured to process the received first message; a transceiver that supports a second wireless or wireline technology configured to obtain the content from a remote server that stores the requested information using the second wireless or wireline technology; and in response thereto the second transmitter transmits a second message to the at least one discovering device comprising details of how the content can be downloaded by the at least one discovering device.

19 Claims, 7 Drawing Sheets

(56) References Cited

U.S. PATENT DOCUMENTS

2016/0278006 A1* 9/2016 Lee .................. H04W 12/04
2017/0318325 A1* 11/2017 Ortiz ............... H04N 21/23614

OTHER PUBLICATIONS

European Patent Application No. 17 205 102.1-1213; Communication Pursuant to Article 94(3) EPC; dated Aug. 6, 2019; 5 Pages.
European Patent Application No. 17 205 102.1-1213; Communication Pursuant to Article 94(3) EPC; dated Mar. 31, 2020; 5 Pages.
European Patent Application No. 17 205 102.1-1213; Communication Pursuant to Article 94(3) EPC; dated Oct. 9, 2020; 5 Pages.
European Patent Application No. 17205102.1-1213, Extended European Search Report dated May 2, 2018, 11 pages.

* cited by examiner

FIG. 1 - Prior Art

WIRELESS COMMUNICATION UNITS AND WIRELESS COMMUNICATION SYSTEM AND METHODS TO SUPPORT BEACON TECHNOLOGY

RELATED APPLICATIONS

This application is a continuation-in-part of co-pending and co-owned U.S. patent application Ser. No. 15/373,202, entitled WIRELESS COMMUNICATION UNITS AND WIRELESS COMMUNICATION SYSTEM AND METHODS TO SUPPORT BEACON TECHNOLOGY and filed Dec. 8, 2016, which is incorporated by reference in its entirety herein.

TECHNICAL FIELD

The field of this invention relates generally to wireless communication units and a wireless communication system that supports beacon technology. In particular, some example embodiments of the invention provide for Wi-Fi assisted cached content download for Bluetooth beacons.

BACKGROUND

A recent development in third generation (3G) wireless communications is the long term evolution (LTE) cellular communication standard, sometimes referred to as $4^{th}$ generation (4G) systems. Both of these technologies are compliant with third generation partnership project (3GPP™) standards. Subsequently, wireless communication units compliant with these communication standards have been enhanced to additionally support receiving short-range communications, e.g. in the form of beacon transmissions or broadcasts. Beacons are a low-cost piece of hardware, typically small enough to attach to a wall or countertop, that use battery-friendly, low-energy typically Bluetooth™ connections in order to transmit messages or prompts directly to a smartphone or tablet. They are poised to transform how retailers, event organizers, transit systems, enterprises, and educational institutions communicate with people indoors. It is anticipated that consumers may even want to deploy them as part of home automation systems.

In the case of a Bluetooth™ low energy ("BLE™" or "Bluetooth LE"), advertising packets are used to send information which either: (i) provides certain identity information (e.g., universal unique identifier (UUID), major and minor in the case of Apple ibeacon™) from the device that transmits the beacon to the discovering device; or (ii) provides a uniform resource locator (URL) to a discovering device.

Advertising packets are, by their definition, very small, for example carrying at most 31 bytes of advertising data in the case of a BLE™ beacon. Hence, the device that discovers the beacon (often referred to as the "discovering device") does not communicate with the beacon function once it discovers it and obtains the information advertised by the beacon. Instead, the discovering device uses the information received from the beacon to communicate using other conventional connectivity solutions, for example WiFi™ or cellular technologies, in order to download the desired information from a backend server, e.g. located in the internet. In the case where a URL is broadcast by the beacon this is straightforward. In the case where certain identity (ID) information is provided to the discovering device this ID information often includes an indication of the owner of the beacon (broadcasting) device and its location. This information can then be used by the discovering device to obtain information appropriate for the discovered beacon, typically from cloud based servers.

In the case of Apple's ibeacon™, the beacon is only allowed to indicate an identity of the beacon (broadcasting) device (in a UUID), that defines a specific application or owner, say the national gallery, the beacon also includes location information in the form of a major part and a minor part (the major part would say specify a wide area, e.g. a first floor of a gallery, whereas the minor part would specify, say a specific painting).

This information may then be used by an 'app' on the discovering device to request the relevant information from a backend server. For instance, if a beacon was encountered that was associated with a particular shop, then an app on the discovering device would ensure that the discovering device would download an appropriate 'coupon', say, corresponding to the shop from a backend server.

Typical well-known BLE™ beacon formats are Google™'s Eddystone™ [see https://github.com/google/eddystone/blob/master/protocol-specification.md] and Apple™'s iBeacon™ [see https://developer.mbed.org/blog/entry/BLE-Beacons-URIBeacon-AltBeacons-iBeacon/].
Eddystone™ can be configured to provide an identity (Eddy stone-UID) or a URL (Eddy stone-URL).

FIG. 1 shows diagrammatically 100 how information is traditionally obtained by a discovering device 120, typically a mobile device such as a smartphone, tablets laptops, upon detecting a specific Bluetooth™ beacon from a BLE™ beacon device 110. The BLE™ beacon device 110 sends a periodic transmission 112 of BLE advertising packet(s), which are received and processed by the discovering device 120. The periodic transmission 112 contains a URL where content is contained and may be obtained directly or indirectly based on the information in the advertising packet(s). If the discovering device 120 decides that they wish to obtain the content, they send a request 132 for the content via an initial transport technology interface 130, e.g. a WiFi™ or cellular interface through the internet 140 to a backend server 150 containing the appropriate content. In such known scenarios, the discovering device (particularly when mobile) will often have no option but to use such relatively slow communications technology, e.g. cellular (or a least one where resources are scarce). Once the wireless transport technology has been traversed, wired transport technologies will likely be used, such as Ethernet, and hence the term 'initial transport technology' has been used. The backend server 150 then returns 134 the requested appropriate content to the discovering device 120, for example via the initial transport technology interface 130.

There are a number of problems associated with this architecture for rapid delivery of content to a Discovering Device. First, data rates that can be achieved to obtain the content may be constrained by the use of technologies, such as cellular. Even if local Wi-Fi™ is used as the initial transport technology to obtain the required content, this may be highly congested by other users, or indeed the backhaul load (e.g., ADSL), which may have a slow connection for rapid video content downloads. Furthermore, the request for the content and the response must traverse the internet. This may result in reduced rate, increased delays, and also increased traffic in an already congested network.

It is noteworthy that the aforementioned content is very typically tied to a particular geographical location, such that the data to be downloaded is able to change very infrequently as it is tied exclusively to that location. For instance, the BLE™ beacon could be associated with an exhibit in a museum, and whenever a discovering device discovers the beacon the same content describing the exhibit should be downloaded. Given this observation it may be reasonable to assume that the content that is to be delivered to discovering devices should be stored in the BLE™ Beacon device and that BLE™ transport technology itself should be used to deliver the content. This is certainly feasible from a BLE™ technology perspective and would remove the necessity for the discovering device to traverse the internet to obtain the content.

However, there are a number of problems with this approach. First, BLE™ offers very low throughput rates, which are likely to be less than those obtained using conventional mechanisms, and as such, would restrict the type of content that would be accessed by the discovering device. Secondly, once a connection is made, the BLE™ device will have to stop transmitting beacons, and hence other users of potential discovering device will be unable to see beacon transmissions.

In order to improve throughput rates it would be beneficial if a Wi-Fi™ connection (or other high rate short range technology) was formed between the Beacon device and the discovering device. However, in the case that a WiFi™ connection is used to deliver the stored content on the Beacon device, the following occurs. First, the Wi-Fi™ function associated with the Beacon device needs to take on the role of an Access Point (AP), but in most cases this is problematic, as there are likely to be a large number of Wi-Fi™ APs that the discovering device can see. Secondly, therefore, the discovering device needs to know the service set identifier (SSID) of the Wi-Fi™ function's Basic Service Set (BSS). Additionally, it is important that the process is automated, e.g. without user intervention, such that in the case where the discovering device is a smartphone, the user isn't left with a list of SSIDs that are available and have to guess which one to join to download the desired content.

As part of the specified functionality, BLE™ provides a means whereby an advertiser beacon device can be prompted to send more information (an additional 31 bytes of payload is available). This involves the scanner device (which in this case will be the discovering device) sending a scan request packet and in response the advertiser beacon will send a scan response packet. This is defined behaviour that is specified in v4.2 of the BT™ specification, e.g. in https://www.bluetooth.com/specifications/adopted-specifications. Advertising packets can be configured as follows in Table 1:

TABLE 1

| Advertising Event Type | Protocol Data Unit (PDU) advertising event type | Allowable response PDUs for advertising event | | Can contain ADV data payload (0-31 octets) |
|---|---|---|---|---|
| | | SCAN_REQ | CONNECT_REQ | |
| Connectable Undirected Event | ADV_IND | YES | YES | YES |
| Connectable Directed Event | ADV_DIRECT_IND | NO | YES (only directly addressed initiator can respond) | NO |
| Non-connectable Undirected Event | ADV_NONCONN_IND | NO | NO | YES |
| Scannable Undirected Event | ADV_SCAN_IND | YES | NO | YES |

Typical BLE beacons used by Eddystone and iBeacon are configured as ADV_NONCONN_IND, such that they cannot be scanned, or connected. However, it is possible to configure the advertiser to be an ADV_SCAN_IND type packet, which allows a scan_REQ to be sent by a discovering device for more information, but does not allow a Bluetooth™ LE connection to be made. Allowing advertising packets to be configured as other than ADV_NONCONN_IND is explicitly suggested as stated in the Eddystone specifications see https://github.com/google/eddy stone/issues/36.

A solution is therefore required for almost instantaneous content delivery to discovering devices based on BLE™ beacon advertisement data.

SUMMARY OF THE INVENTION

In a first aspect of the invention, a beacon device for communicating with at least one discovering device is described. The beacon device comprises: a transceiver that is configured to obtain content from a remote server using a first wireless technology or a wireline technology; a second transmitter configured to transmit at least a beacon indicator on a second wireless technology; a second receiver configured to receive a first message from the discovering device in response to the beacon indicator on the second wireless technology requesting information relating to the beacon indicator; a controller operably coupled to the second receiver and configured to process the received first message; and in response thereto the second transmitter transmits a second message to the at least one discovering device comprising details of how the at least one discovering device is to download the content.

In this manner, almost instantaneous content delivery to discovering devices based on BLE™ beacon advertisement data may be achieved by use of a beacon that indicates a local availability of content. Furthermore, in this manner, scarce cellular resources are preserved by allowing discovering devices, typically smartphones, to obtain the content using short range technologies such as 802.11 WiFi. Additionally, these devices are typically lower power than those performing normal cellular functionality, thereby improving smartphone battery life. Additionally, in this manner, traversals of the internet to a network server are not required every time a discovering device wishes to download the content. Additionally, in this manner, backward compatibility to Apple iBeacon or Google Eddystone beacon functionality in the conventional form is maintained for smartphones not employing the functionality described here.

Furthermore, content can be updated to the beacon from a network server using the first wireless technology but advantageously, this may be performed only when the content needs to be updated and not every time a discovering device wishes to obtain the content.

In an optional example of the invention, the beacon device may comprise an 802.11 access point, AP, or WiFi™ AP, and the second message may comprise at least an identifier of the 802.11 or WiFi™ AP to enable the at least one discovering device to associate with the 802.11 AP or WiFi™ AP.

In an optional example of the invention, the second message may comprise a service set identifier, SSID, of the 802.11 AP or WiFi™ AP and a pre-shared key, PSK, for a WiFi™ download.

In an optional example of the invention, the beacon indicator may be a URL and the first message may be a google Eddystone™ beacon, or the beacon indicator may be a beacon identity and the first message may be an Apple™ ibeacon™.

In an optional example of the invention, the controller may contemporaneously start a wireless circuit of the 802.11 or WiFi™ AP following a response from the discovering device to the second message.

In an optional example of the invention, the beacon device may be configured to employ a two-way information exchange process with the discovering device via 802.11 WiFi™ functionality.

In an optional example of the invention the two-way information exchange comprises service discovery functionality when the discovering device has been informed of the service set identifier, SSID, of the 802.11 AP, In an optional example of the invention, the two-way information exchange provides more information regarding the content that is available from the beacon device.

In an optional example of the invention, the beacon device comprises memory, or comprises a port for coupling to external memory, configured to store the content obtained from the remote server.

In an optional example of the invention, the beacon device may comprise a management 802.11 AP circuit configured to manage uploading of data to the beacon device for storage in the memory or coupled external memory.

In an optional example of the invention, in response to the second wireless technology being Bluetooth™, the received first message may be a scan request message and the second message may be a Bluetooth™ low energy, LE, scan response message.

In an optional example of the invention, the second wireless technology is Bluetooth™ low energy, LE, and the first message is a compliant Bluetooth™ beacon.

In an optional example of the invention, the beacon device may further comprise an encryption circuit coupled to the controller and configured to encrypt the second message.

In an optional example of the invention, the first wireless technology comprises at least one from a group of: WiFi™, cellular communications.

In a second example of the invention, an integrated circuit for a beacon device for communicating with at least one discovering device is described. The integrated circuit comprises: at least one first port coupled to a transceiver configured to obtain content from a remote server using a first wireless technology or wireline technology; at least one second port coupled to a second transmitter configured to transmit at least a beacon indicator on a second wireless technology; and coupled to a second receiver configured to receive a first message from the discovering device in response to the beacon indicator on the second wireless technology requesting information relating to the beacon indicator; a controller operably coupled to the second receiver and configured to process the received first message; and in response thereto the controller is configured to transmit a second message via the second transmitter to the discovering device comprising details of how the at least one discovering device is to download the content.

In a third example of the invention, a method for a beacon device to communicate with at least one discovering device is described. The method comprises, at the beacon device: obtaining content from a remote server using a first wireless technology or wireline technology; transmitting at least a beacon indicator via a second transmitter on a second wireless technology; receiving a first message from the discovering device in response to the beacon indicator on the second wireless technology requesting information relating to the beacon indicator; processing the received first message; and in response thereto transmitting a second message to the discovering device via the second transmitter comprising details of how the at least one discovering device is to download the content.

In a fourth example of the invention, a wireless communication unit for communicating with a beacon device, such as a discovering device, is described. The wireless communication unit comprises: a receiver configured to receive at least a beacon indicator on a second wireless technology; a transmitter configured to transmit a first message to the beacon device in response to the received beacon indicator on the second wireless technology requesting information relating to the beacon indicator; wherein the receiver is configured to receive a second message from the beacon device comprising details of how the content is to be downloaded; a controller operably coupled to the receiver and configured to process the received second message; and a second receiver that supports a first wireless technology; wherein the controller is configured to associate itself with an access point, AP, of the beacon device in response to the second message and obtain the content from the AP using the first wireless technology.

In an optional example of the invention, the wireless communication unit may comprise an 802.11 access point, AP, or WiFi™ AP, and the second message may comprise at least an identifier of the 802.11 or WiFi™ AP to enable the at least one discovering device to associate with the 802.11 AP or WiFi™ AP.

In an optional example of the invention, the second message detailing how the content is to be downloaded may comprise a service set identifier, SSID, of the AP and a pre-shared key, PSK, for a WiFi™ download.

In an optional example of the invention, the beacon indicator may be a URL and the first message may be a google Eddystone™ beacon, or the beacon indicator may be a beacon identity and the first message may be an Apple™ ibeacon™.

In an optional example of the invention, wherein, when the second wireless technology is Bluetooth™, the transmitted first message may be a scan request message and the second message may be a Bluetooth™ LE scan response message.

In an optional example of the invention, the receiver may be configured to receive both a beacon indicator and advertised content on the second wireless technology.

In an optional example of the invention, the wireless communication unit may further comprise a decryption circuit coupled to the controller and configured to decrypt the first message.

In an optional example of the invention, the wireless communication unit may be configured to employ a two-way information exchange process with the beacon device via 802.11 WiFi™ functionality.

In an optional example of the invention, the two-way information exchange may comprise service discovery functionality that includes an SSID of the 802.11 AP.

In an optional example of the invention, the two-way information exchange may provide more information regarding the content that is available from the beacon device.

In a fifth example of the invention, an integrated circuit for a wireless communication unit for communicating with a beacon device, the integrated device comprising: at least one first port coupled to a receiver configured to receive at least a beacon indicator on a second wireless technology and coupled to a transmitter configured to transmit a first message to the beacon device in response to the received beacon indicator on the second wireless technology requesting information relating to the beacon indicator; a controller operably coupled to the receiver and configured to process a received second message from the beacon device comprising details of how the content is to be downloaded; and at least one second port coupled to a second receiver that supports a first wireless technology; wherein the controller is configured to associate itself with an access point, AP, of the beacon device in response to the second message and obtain the content from the AP using the first wireless technology.

In a sixth example of the invention, a method for a wireless communication unit to communicate with a beacon device is described. The method comprises, at the wireless communication unit: receiving at least a beacon indicator on a second wireless technology; transmitting a first message to the beacon device in response to the received beacon indicator on the second wireless technology requesting information relating to the beacon indicator; receiving a second message from the at least one beacon device comprising details of how the content is to be downloaded; processing the received second message; associating the wireless communication unit with an access point, AP, of the beacon device in response to the second message; and obtaining the content from the AP using a transceiver that supports a first wireless technology.

In a seventh example of the invention, a wireless communication system that supports multiple wireless technologies is described. The wireless communication system comprises at least one discovering device; a beacon device for communicating with the at least one discovering device. The beacon device comprises: a transceiver that is configured to obtain content from a remote server using a first wireless technology or a wireline technology; a second transmitter configured to transmit at least a beacon indicator on a second wireless technology; a second receiver configured to receive a first message from the discovering device in response to the beacon indicator on the second wireless technology requesting information relating to the beacon indicator; a controller operably coupled to the second receiver and configured to process the received first message; and in response thereto the second transmitter transmits a second message to the discovering device comprising details of how the at least one discovering device is to download the content.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

Figure 1:
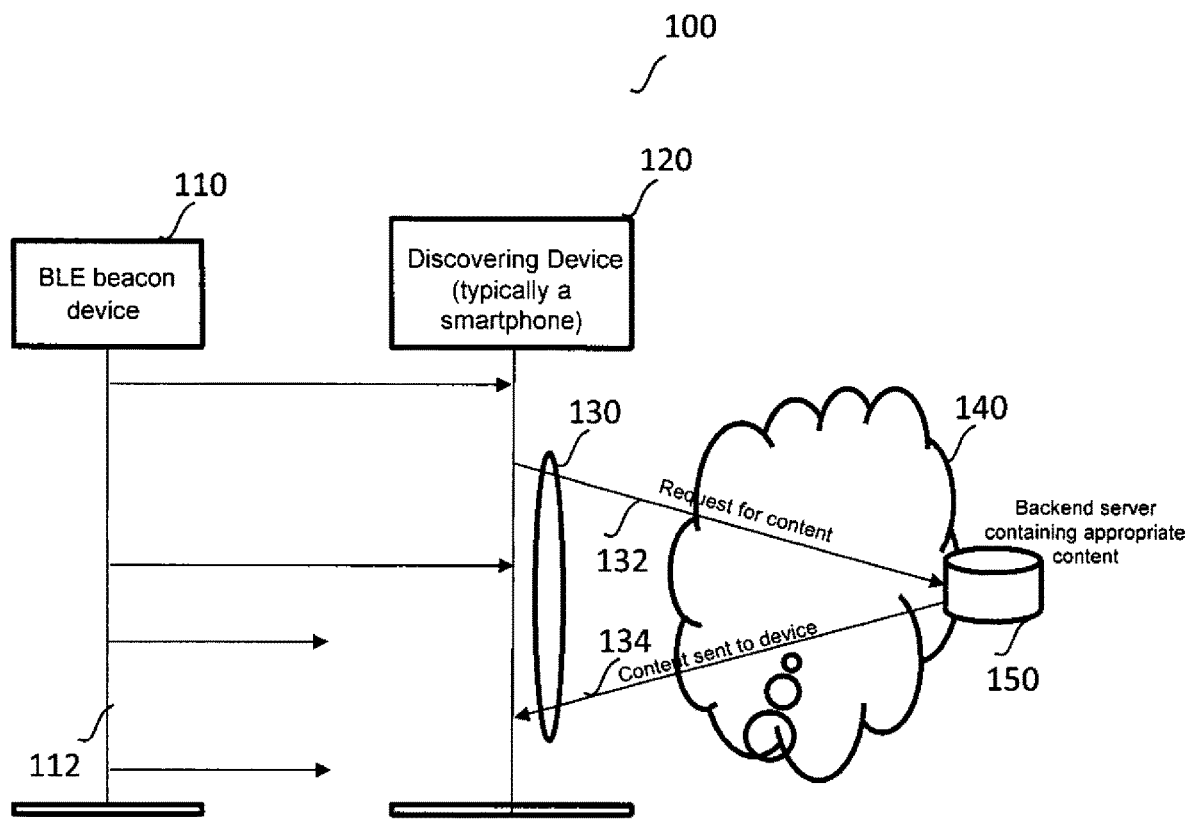
FIG. 1 illustrates an overview of a known wireless communication system.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Example embodiments of the present invention are described with respect to a device that transmits beacons, such as Bluetooth beacons, a beacon device. Example embodiments of the present invention provide a mechanism for almost instantaneous content delivery to discovering devices, for example based on BLE™ beacon advertisement data. In accordance with some example embodiments, however, the beacon device has (or is operably coupleable to) memory storage and includes multiple short-range wireless functionality and circuits, for example WiFi and Bluetooth LE. Advantageously, some example embodiments of the invention utilize known advertising packets without modification, e.g. an Eddystone™ or iBeacon™ format. Eddystone™ and iBeacon™ use data fields within the conventional BLE advertising packets. Therefore, and advantageously, some example embodiments of the invention provide backward compatibility to Eddystone™ and iBeacon™. In some examples, an ability to use conventional a short range fast-rate communication link is supported for the rapid download of content desired by a discovering device.

In some examples, a BLE beacon may be employed, which may be fully backward compatible with conventional Bluetooth functionality, for example in the Google™ Eddystone™ case. Some examples also provide a mechanism to send the required information, via a short-range communication link, such as a Bluetooth™ LE scan response message, in order to allow a discovering device to be associated with a WiFi™ AP function incorporated in the beacon device through which content can be sent directly between the beacon device and the discovering device. Some examples also provide a mechanism to encrypt the information related to the WiFi™ AP sent to the discovering device in a short-range (second) message, such as a Bluetooth™ LE scan response.

In some examples, a beacon indicator that is employed may define a URL, for example in the Google™ Eddystone™ case. In this case, a discovering device may still obtain a desired web page locally from the beacon. In other examples, a beacon indicator that is employed may be a beacon identity, for example in the iBeacon™ case. Thus, hereafter, a mention of a beacon indicator may encompass a beacon that defines a URL and/or a beacon identity and/or other such mechanisms that enable a beacon to be used for almost instantaneous content delivery to discovering devices.

Figure 2:
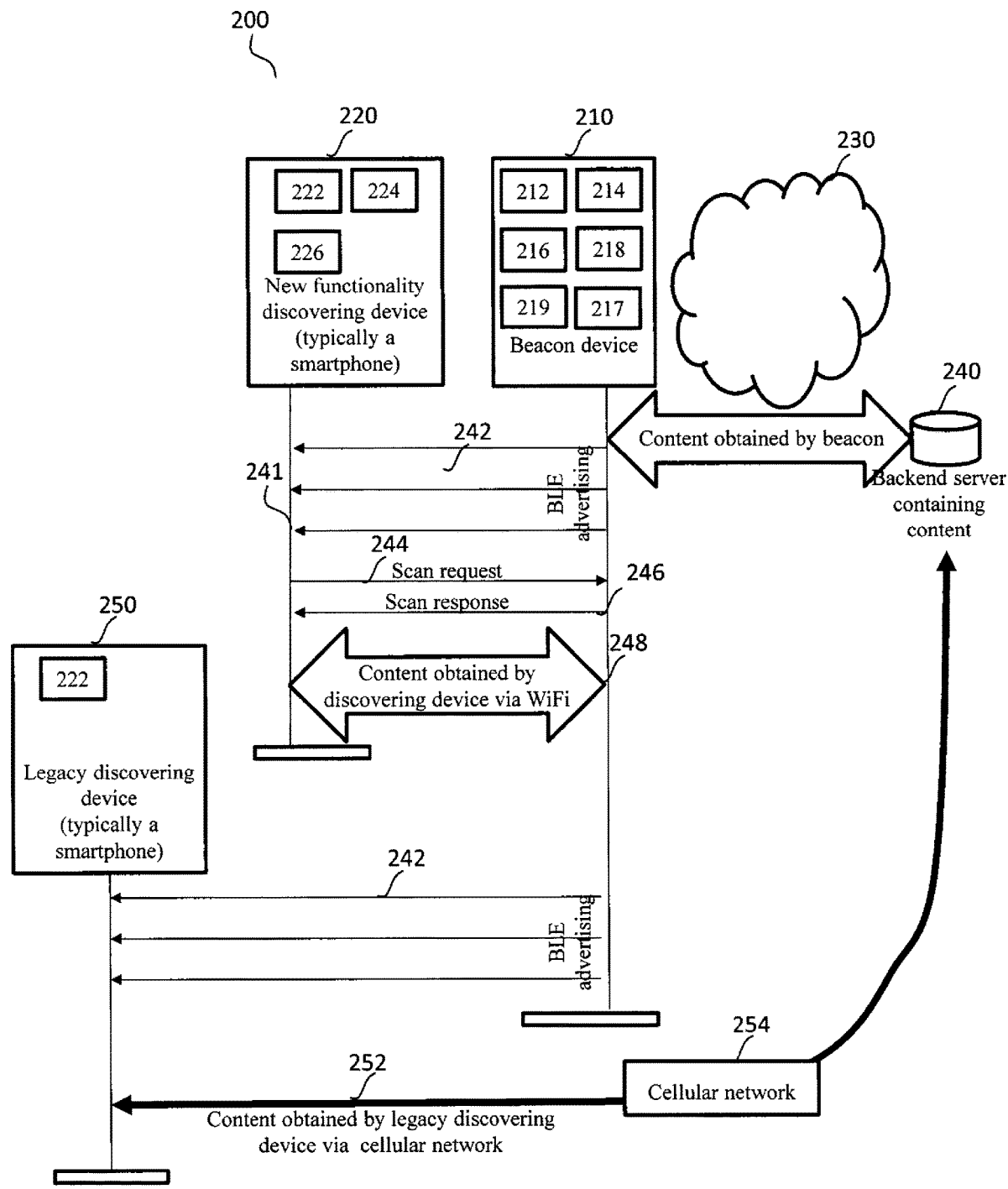
FIG. 2 illustrates an example message sequence chart highlighting communications between a wireless beacon device and a wireless discovering device, such as a smartphone, in accordance with some example embodiments of the present invention.

Referring now to FIG. 2, a wireless communication system 200 is shown in outline, in accordance with one example embodiment of the invention. In this example embodiment, the wireless communication system 200 comprises a beacon device 210 for communicating with at least one discovering device 220, which in some examples could be a smartphone and a legacy discovering device 250, which in some examples could also be a smartphone. The wireless communication system 200 includes a short-range communication link 241 between the beacon device 210 and at least one discovering device 220 and the legacy discovering device 250, which is illustrated in a form of a message sequence chart. The beacon device 210 is also coupled to a server 240 via a communication transport medium, such as the internet 230, where the server 240 stores content that may be desired by one or more discovering devices 220. A conventional cellular network 254 (where in some examples a conventional WiFi™ access point can also be used) is also shown, which will allow legacy devices 250 to obtain access to the server 240 in order to obtain content.

In examples of the invention, the beacon device 210 includes memory 217 that is configured to store content downloaded from the server 240. In other examples, the beacon device 210 may be coupled to external memory that is configured to store content downloaded from the server 240. In some examples of the invention, the beacon device 210 obtains the content from the server 240 via any suitable wireless or wireline means, such as 3G cellular or Long Term Evolved (LTE™), or Ethernet communications.

The beacon device 210 includes a second transmitter 212 configured to transmit at least a beacon indicator, such as a beacon identity or a beacon that defines a URL, on a second wireless technology. In some examples, the second transmitter 212 transmits BLE advertising messages 242 that incorporate the beacon indicator. In other examples, the second transmitter 212 may transmit other short-range messages that incorporate the beacon identity. In yet further examples, the beacon may simply transmit a URL value that does not contain a beacon identity.

The beacon device 210 includes a second receiver 214 configured to receive a first message 244 from the discovering device 220 in response to the beacon on a second wireless technology, such as Bluetooth™ requesting information relating to the beacon indicator. In a BT™ context, the first message received from the discovering device 220 may be a scan request message. In some examples, the request for more information may be a SCAN_REQ as defined in Bluetooth™ Low Energy (LE) specification. A controller 216 is coupled to the second receiver 214 and configured to process the received first message.

A transceiver 218 is configured to obtain the content from a remote server 240 that has stored the requested/desired content, using a first wireless technology or wireline technology. In examples of the invention, the beacon device 210 may obtain the content from the server 240 before or during transmitting advertising messages.

In response to a request from the at least one discovering device 220 the second transmitter 212 transmits a second message 246 to the discovering device 220. As the beacon device 210 has already obtained the content from the server 240, and stored the content in memory, e.g. memory 217, the beacon device 210 can facilitate delivery of the (now) locally stored content. In this manner, the second message 246 includes details of how the content can be downloaded by the discovering device 220. In a BT™ context, the second message 246 sent to the discovering device 220 may be a scan response message.

In one example, the beacon device 210 may include (as shown), or be coupled to, an access point 219 coupled to the memory 217. Memory 217 may then be used to store the content obtained from server 240. In this context, in order for the at least one discovering device 220 to be able to access the content, the details of how the content can be downloaded by the discovering device 220 sent to the at least one discovering device 220 may include the AP details, contained in message 246. In one example, a separate WiFi™ AP may be incorporated in the beacon device 210, which may be configured to send content to discovering devices using a WiFi™ connection.

The WiFi™ AP can provide controlled access (e.g., password protected) to discovering devices that can provide for local management of content, such as specially configured smartphones, tablets, laptops or desktops. This allows any one of the content management devices aforementioned to upload data to the beacon device 210 using this management AP circuit (not shown). In effect the management device behaves as a local management terminal (LMT). Once content is uploaded from the LMT device, a controller, such as controller 216 or a controller associated with the AP 219 is configured to control the content that is extracted from memory for downloading 248 to the discovering device 220, for example over a WiFi™ connection. In some examples, for LMT device access, there may be no need to use any beacons as the AP details will be known apriori, and thus no beacon functionality would be needed.

In some examples after it has obtained AP information from message 246, the discovering device 220 may use a simple 802.11 probe request as part of the process of associating with the AP. In some optional examples, the devices may employ a two-way information exchange process, an example of which would be the service discovery functionality described in 802.11u. This could be used to provide more information regarding the content that is available in the cached content in the beacon device. If at this stage the discovering device does not find content that it was interested in, in some examples it could abort the transaction without forming an association with the AP.

In examples of the invention, the device discovery functionality incorporates short-range transport technology of a comparable range to the beacon range (e.g. not cellular communication range). However, in some examples, the discovering device 220 may be of a form of, say, a smartphone, and thus includes multiple wireless technologies including cellular communication circuits for wide-range communication and short-range communication circuits to support short-range communication technologies, such as Bluetooth™ and/or WiFi™, etc. In one example, the discovering device 220 (and the legacy discovering device 250) is a wireless communication unit for communicating with the beacon device 210, and includes a receiver 222 configured to receive at least a beacon indicator on a second wireless technology, e.g. BT™. In one example, the beacon indicator may be contained within BLE advertising messages broadcast by the beacon device 210. The legacy discovering device 250 uses the content of the beacon indicator directly in order to obtain the address of the server and the appropriate request message. This is sent to the server via, say, an existing wide area connectivity functionality (separate to BLE), e.g., cellular network 254. Note that the same advertising messages 242 are used by both the discovering device 220 and the legacy discovering device 250.

In examples of the invention, the discovering device 220 further includes a transmitter 224 configured to transmit the first message 244, which in some examples is a BT™ scan request message, to the beacon device 210 in response to the received beacon on the second wireless technology. The legacy discovering device 250 does not contain a transmitter, such as transmitter 224. In this example, the first message 244 is a request for more information, e.g. details about the AP and how/where content relating to the beacon indicator can be downloaded. The receiver 222 is configured to receive the second message, 246, from the beacon device 210 comprising more information, e.g., details about the AP and where content relating to the beacon indicator can be downloaded. A controller 226 is coupled to the receiver 222 and configured to process the received second message. In some examples, the receiver 222 and transmitter 224 supports Bluetooth™. In some examples, the wireless communication unit includes a (further) transceiver that supports a first wireless technology, such as WiFi™, which is used by the controller 226 to associate itself with the access point (AP) 219 of the at least one beacon device 210 in response to information contained in the second message and obtain the content from the AP 219 using the first wireless technology, such as WiFi™. It is noteworthy that the content that is obtained by the discovering device 220 is the same as the content obtained by the legacy discovering device 250 but where the discovering device 220 did not need to request the content from the server 240 directly as the content had already been loaded onto the beacon device 210 and so could be obtained directly and advantageously from the beacon device.

Figure 3:
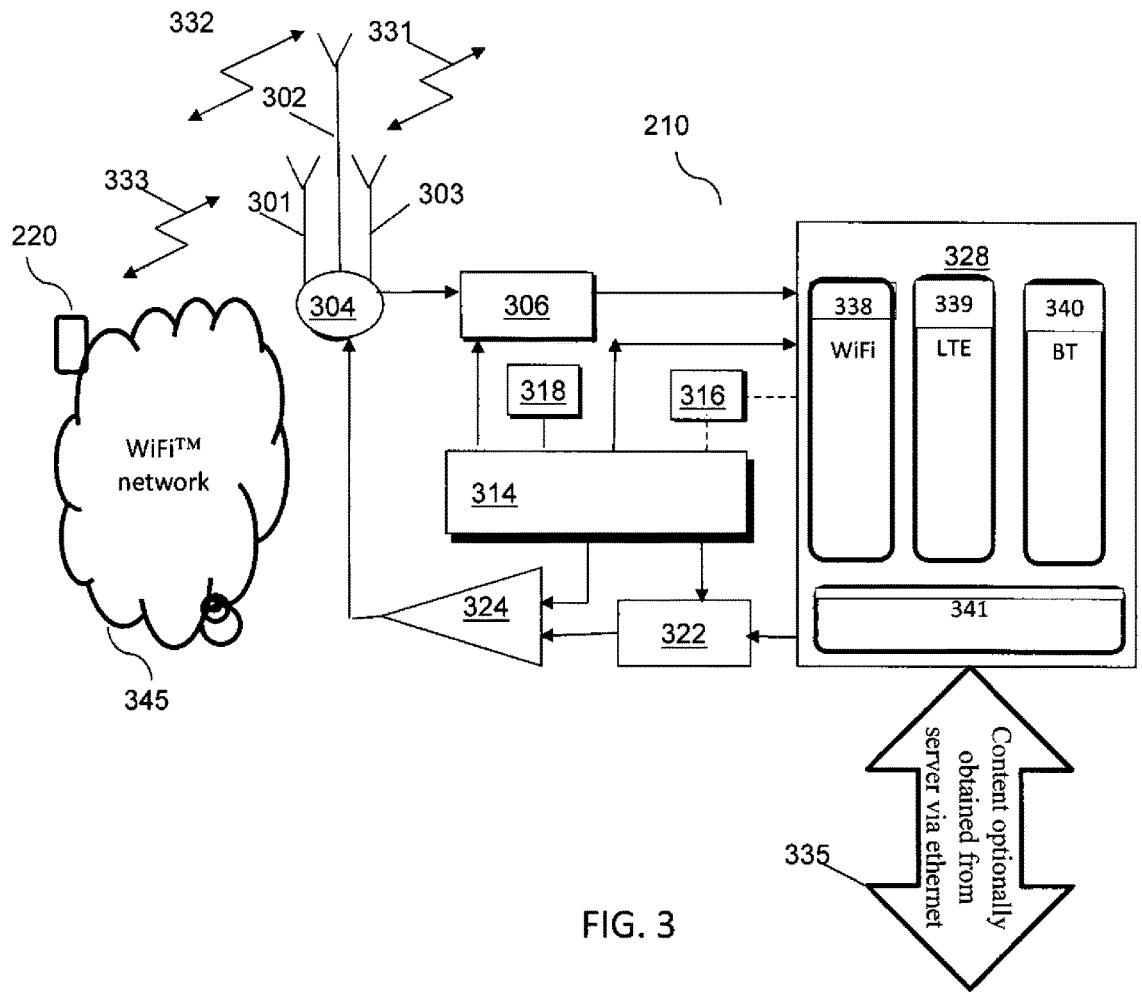
FIG. 3 illustrates an example wireless beacon device in accordance with some example embodiments of the present invention.

Referring now to FIG. 3, a block diagram of a wireless communication unit, adapted in accordance with some example embodiments of the invention, is shown. In practice, purely for the purposes of explaining embodiments of the invention, the wireless communication unit is described in terms of a beacon device, such as beacon device 210 of FIG. 2. However, a skilled artisan will recognize that a similar circuit structure will exist for a discovering device 220, such as a smartphone. As illustrated, the wireless communication unit 210 contains multiple antennae 301, 302, 303 for communicating via various technologies. In one example, antenna 301 (and associated transmit and receive circuitry) is configured to radiate and receive radiated signals 333 on WiFi™ frequencies, for example over a WiFi™ network 345 when communicating with discovering device 220. In one example, antenna 302 (and associated transmit and receive circuitry) is configured to radiate and receive radiated signals 332 on BT™ frequencies. In one example, antenna 303 (and associated transmit and receive circuitry) is configured to radiate and receive radiated signals 331 on cellular frequencies, e.g., LTE™ over a cellular network (not shown).

In this example, each of the multiple antennae 301, 302, 303 are coupled to an antenna switch or duplexer 304 that provides isolation between receive and transmit chains within the wireless communication unit 210, as well as providing isolation between circuits targeted for the specific technologies being supported, e.g., LTE™, WiFi™, BT™. One or more receiver chains, as known in the art, include receiver front-end circuitry 306 (effectively providing reception, filtering and intermediate or base-band frequency conversion). The receiver front-end circuitry 306 is coupled to a signal processor 328 (generally realized by a digital signal processor (DSP)). A skilled artisan will appreciate that the level of integration of receiver circuits or components may be, in some instances, implementation-dependent.

A controller 314 maintains overall operational control of the wireless communication unit 210. The controller 314 is also coupled to the receiver front-end circuitry 306 and the signal processor 328. A timer 318 is operably coupled to the controller 314 to control the timing of operations (e.g. transmission or reception of time-dependent signals) within the wireless communication unit 210.

Examples describe a beacon device that locally stores the content to be transferred to the discovering device through, say, a WiFi™ connection or, as the case may be, in other implementations of the beacon device through another wireless connection such as a 3GPP-based protocol (e.g., LTE Proximity Services). There are a number of different approaches that are envisaged can be employed for content storage in the beacon device 210. Thus, in some examples, the controller 314 is coupled to a memory device 316 that selectively stores operating regimes, such as decoding/encoding functions, synchronization patterns, code sequences, and the like. In examples of the invention, memory device 316 is configured to store content received from a remote server, e.g. server 240 in FIG. 2. A content management function (not shown) can be used to control the content contained in the memory 316 of the beacon device 210.

As regards the transmit chain, this essentially includes the signal processor 328 being coupled through one or more transmitter/modulation circuits 322 and one or more power amplifiers 324 to the multiple antennae 301, 302, 303, which may be in a form of an antenna array, or a plurality of antennas. The transmitter/modulation circuits 322 and the power amplifiers 324 are operationally responsive to the controller 314.

In accordance with example embodiments, wireless communication unit 210 and in particular signal processor 328 of wireless communication unit 210 has been configured to support multiple short-range technologies, e.g., WiFi™ and BT™. In this example, it is beneficial that the multiple short-range technologies have a similar or approximately the same range. In this example, the beacon technology is relatively low power, e g. devices typically use little power searching for these beacons and the actual beacon device 210 itself takes little power transmitting the beacon. Furthermore, in this example, the technology used to transfer the content is capable of high throughput rates, considerably higher than the technology used for the beacon.

In addition, wireless communication unit 210 and in particular signal processor 328 of wireless communication unit 210 has been configured to support LTE™ operation or a wireline connection such as Ethernet, in order to at least download content from a remote server, e.g., server 240 in FIG. 2.

In some examples, signal processor 328 may perform all of the functions required of the wireless communication unit 210, or in other examples the signal processor 328 may encompass multiple signal processors, for example dedicated to the various technologies being supported. In this regard, signal processor 338 supporting WiFi™ may be implemented as distinct from the signal processor 339 supporting LTE™, and distinct from the signal processor 340 supporting BT™, and distinct from the signal processor 341 supporting Ethernet™ communication, as shown. Alternatively, a single processor may be used to support each technology. Clearly, the various components within the wireless communication unit 210 can be realized in discrete or integrated component form, with an ultimate structure therefore being an application-specific or design selection.

Figure 4:
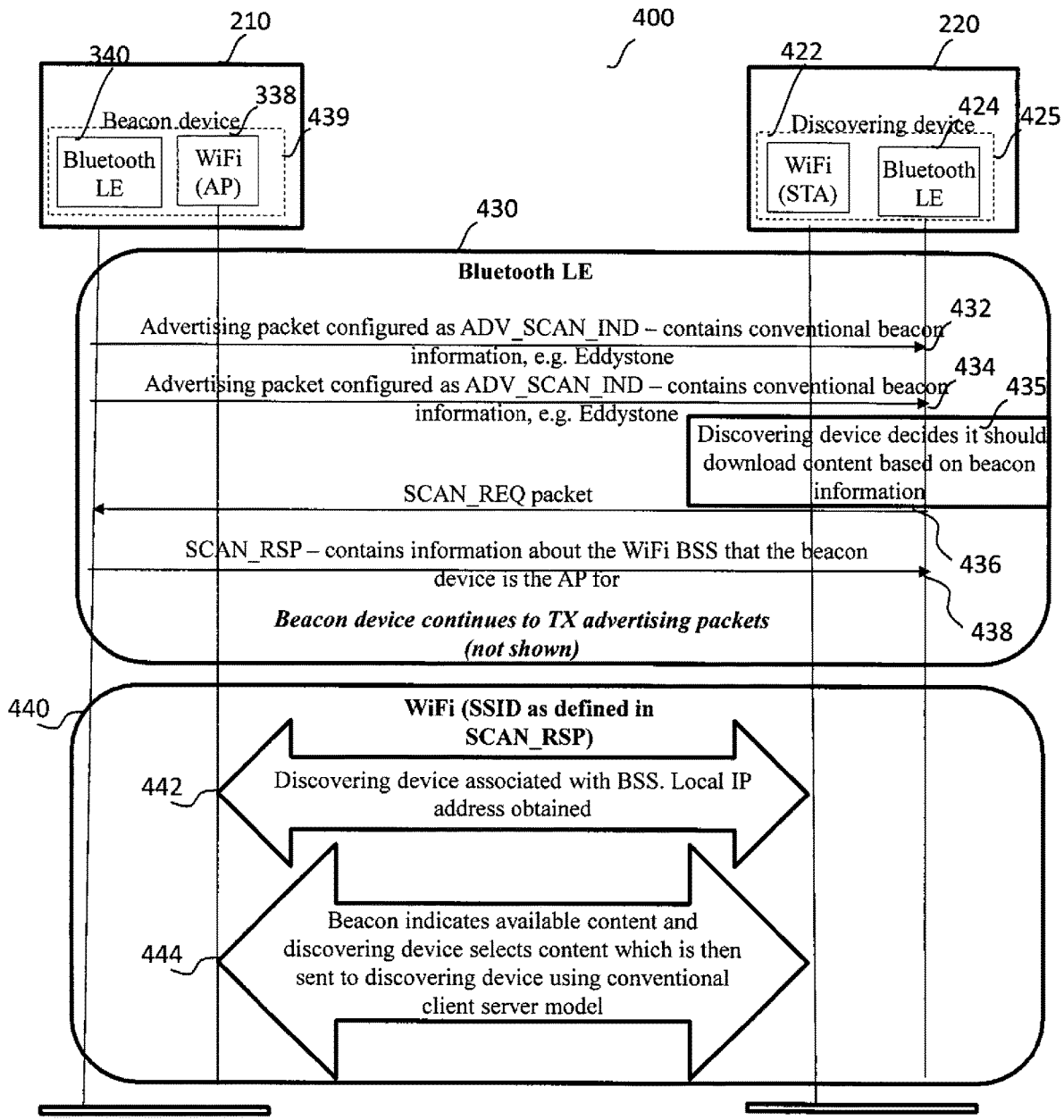
FIG. 4 illustrates an example message sequence chart for communication between a beacon device and a discovering device adapted in accordance with some example embodiments of the present invention.

FIG. 4 illustrates an example message sequence chart for communication between a beacon device, for example beacon device 210 of FIG. 3, and a discovering device, for example discovering device 220 of FIG. 3, for example beacon device, in accordance with some example embodiments of the present invention. The beacon device 210 includes a BLE circuit, such as BLE processor 340 of FIG. 3 and a WiFi™ processor, such as WiFi™ processor 338 of FIG. 3, which may be operating as an AP. In this example, the BLE processor 340 and WiFi™ processor, 338 may be incorporated into an integrated circuit 439. Similarly, the discovering device 220 includes a BLE processor 424 and a WiFi™ processor 422. In this example, the BLE processor 424 and WiFi™ processor, 422 may be incorporated into an integrated circuit 425.

In accordance with example embodiments, a first short-range communication link is used, for example BLE 430 is set up between the BLE processors 340, 424 in the respective beacon device 210 and discovering device 220. Here, wireless communication unit (e.g. beacon device 210) transmits 432 advertising packet containing conventional BLE beacons using, for example, Google's Eddystone beacon format. This advertising packet may be configured as an ADV_SCAN_IND message, indicating that the beacon device 210 is 'scannable' but is not 'connectable'. In some examples, the advertising packet is repeatedly transmitted 434 using a configured periodicity (the advertising interval).

In accordance with example embodiments, discovering device 220 discovers the beacon device 210 and decodes the broadcast beacon in order to determine (at least) the broadcast beacon indicator. In this example, the discovering device 220 decides 435 that it should request more information and subsequently download content based on the beacon information contained in the advertising packet.

In known systems, an advertising packet containing a beacon indicator (e.g. UID in an Eddystone™ case or a beacon identity in an ibeacon™ case), would be broadcast by the beacon device and result in a particular request by the discovering device to a network server for a piece of content. In contrast, and in accordance with example embodiments and in response to the broadcast beacon with the beacon indicator and optionally the advertising packet 432 containing the beacon indicator, the discovering device 220 sends a (first) scan request message 436 to the beacon device 210. In accordance with example embodiments, the discovering device 220 configured to employ beacon functionality has been modified to send scan request packets 436 to the beacon device 210 to obtain information about a possible WiFi™ connection content (or other content transfer technology), in order to obtain thereafter the content.

On reception of the scan_request for more information the BLE processor 340 of the beacon device 210 may initiate/power-up a Wi-Fi base station service (BSS). In one example, such functionality may be achieved with an access point (AP) within or coupled to the beacon device, if one is not already up and running. In this context, the AP may randomly select an service set identifier (SSID) for the BSS and also, if encryption is enabled, randomly select a pre-shared key (PSK).

The BLE processor 340 beacon device 210 then responds (or alternatively responds whilst contemporaneously starting the BSS) to the discovering device 220 with a scan response message 438, which, in some examples, contains the SSID (and optionally the PSK). Thus, in this manner, the beacon device 210 creates a BSS with the parameters contained in the scan response, with the AP being configured to support a fast-rate content download for this WiFi™ network.

The discovering device 220 then associates itself 442 with the BSS/AP that is indicated by the SSID, in order to facilitate WiFi content transfer 440 between WiFi™ processors 338, 422 in the respective beacon device 210 and discovering device 220. In some examples, as the discovering device already knows the SSID which to join, it can immediately perform an active scan for the specific SSID, i.e., it can send an 802.11 probe request frame containing the indicated SSID.

The beacon device 210 is configured to then indicate the available content 444, via the WiFi™ connection, that the content is stored locally in memory, say memory 318 from FIG. 3, either within or connected to the beacon device 210. An app on the discovering device 220 then chooses the content, for example either a) based on an algorithm implemented in the user app, or b) presents a list to the user on the discovering device 220 that may be graphical or textual in order to download the user targeted content that may be contextual (e.g., type of shop) or based on an user's profile, which may be only one specific content file from among several pre-stored (e.g., gender-based such as women's perfume vs. men's cologne). In some examples, these procedures may involve HTTP based protocols (RESTful software architectures), although it is envisaged that in other examples mechanisms, such as a microserver and others are possible.

In some examples of the invention, both the beacon device 210 and discovering device 220 employ the well-known OSI model. In this context, application layer functionality on the discovering device 220 may be configured to determine that the discovering device 220 wishes to download data from the beacon device 210. In some examples, this may well also require input from a user of the smartphone that is acting as a discovering device 220. In one example, the application layer functionality may (i) launch an application (e.g., a museum application) that is associated with the beacon if either this application launch is pre-approved or approved 'on-the-spot' by the user and/or (ii) the application on the smartphone indicates to the user that they are near a particular picture in a gallery and requests whether the user would like to download more information about the art work, for example.

Let us consider one example, for example a user visiting a museum. Known technology would advertise a presence of a beacon (using just an identifier) to the visitor, which would imply (to an appropriately pre-stored application on a visitor/user's device, typically a smartphone) of a particular location. In this example let's assume that there is a pre-stored 'Louvre' app on the smartphone. The visitor/user's device detects the presence of a beacon that indicates the visitor is near the Mona Lisa. The visitor/user's device would then use its cellular connection to send an appropriate query to a remote server to ask about the Mona Lisa. The downloaded information is displayed to the user in the app.

In example embodiments herein described, the information about the Mona Lisa may be the same, for example as it would not change in a real-time manner. This information is downloaded upfront onto the beacon device, or a memory coupled to the beacon device, using either a wireline or wireless technology. In some examples, the beacon is then turned on. Thereafter, when a smartphone locates the beacon, the smartphone knows that it is near the Mona Lisa but also by receiving a response back from the beacon the smartphone is informed of AP details of the beacon device and can then download the information about the Mona Lisa directly from the beacon device. Thus, in accordance with some examples, the beacon functionality described herein may use existing message structures, e.g. Eddystone™ In this manner, legacy devices will behave in the same way as described in this example, and the functionality is fully backward compatible.

Bluetooth™ contains specific data structures that are defined for use within the advertising data. These are specified in the CSS specification, which can be found at: https://www.bluetooth.com/specifications/adopted-specifications]. There is currently no data type defined that is capable of containing information about a Wi-Fi BSS, except by using the manufacturers specific data, which is a proprietary signalling mechanism. Hence, in one example implementation, it is proposed to use this known data structure.

Figure 5:
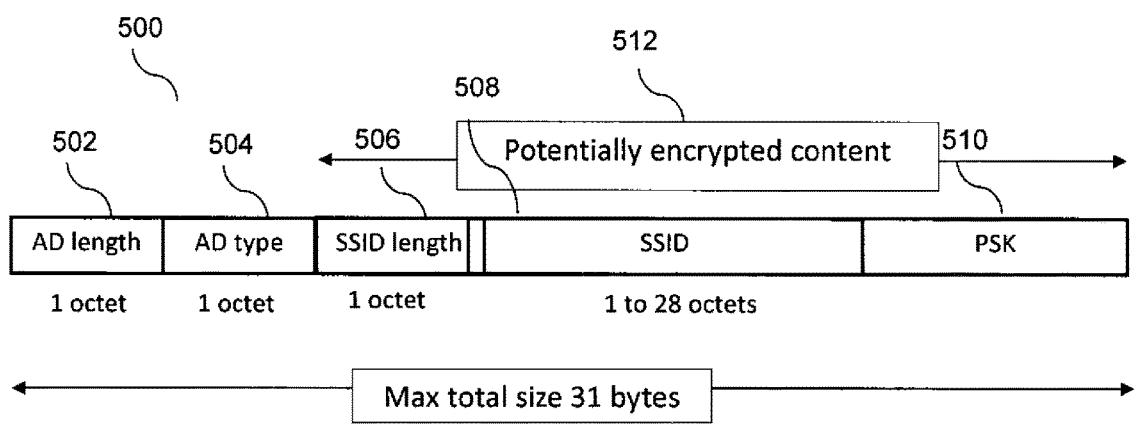
FIG. 5 illustrates an example data structure employable in accordance with some example embodiments of the present invention.

However, in accordance with some examples of the invention, a new defined data structure as illustrated in FIG. 5 may be used. Advantageously, the data structure illustrated in FIG. 5 is fully backward compatible with conventional Bluetooth functionality in the Google™ Eddystone™ case.

FIG. 5 illustrates an example data structure employable in accordance with some example embodiments of the present invention. FIG. 5 defines a new AD type 500 that is compliant with the BLE standard, which specified an SSID field 508 and an optional pre-shared key (PSK) field 510 for a WIFi AP. The advertising data (which can also be sent on scan responses, as is the case here) is made up of multiple AD structures. The maximum volume of data stored in a BT™ scan response is 31 bytes. However an advertising data (AD, as defined in the BT™ specification) type 504 of 1 octet (in the current proposal this will be set to manufacturer's specific data) and AD length field 502 of 1 octet are also required. Thus the total size for the SSID field 508 and optional PSK 510 is limited to 29 bytes. The SSID is required so that the Discovering Device knows the SSID to join. The PSK field 510, for example the known WPA-PSK or WPA2-PSK, may be used to provide secure data transfer from the BSS/AP. If the BSS/AP is to be secured a simple pre-shared key technique may be used and the key contained in the scan response.

It is clearly not desirable to transmit the SSID and PSK unsecured. An optional feature would be to encrypt this data 512, for example, using a conventional symmetric key. Such a key could be fixed for all beacon devices and potential discovering devices. For example, the key could be either be: permanently assigned through the software applications that use the beacon functionality described here, or assigned to the devices from a management function on the beacon devices, or by a backend server. For example, when a user (i.e., the owner of a discovering device) registers for the application, then the key may be securely transferred and assigned to the user's app(s). Such keys may be rotated randomly or on a scheduled basis. It is also envisaged that a stream cipher would be used, due to the fixed block lengths of 128 bits associated with block ciphers.

Figure 6:
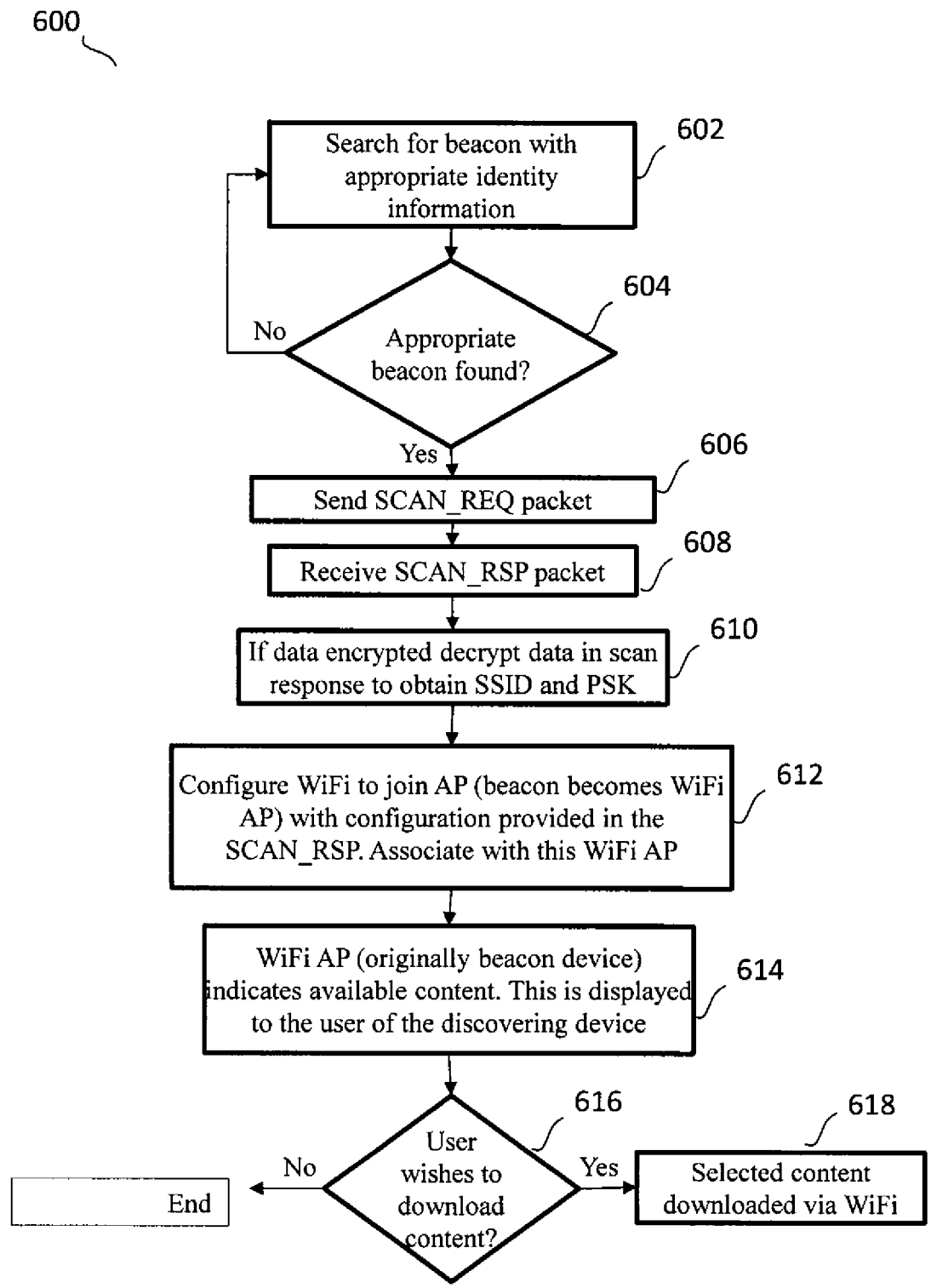
FIG. 6 illustrates an example flowchart of an operation for a discovering device in accordance with some example embodiments of the present invention.

FIG. 6 illustrates an example flowchart 600 of an operation for a discovering device in accordance with some example embodiments of the present invention. At 602, the discovering device searches for a beacon with appropriate indicator information, such as a beacon identity. At 604, a determination is made as to whether an appropriate beacon has been found. If an appropriate beacon has not been found at 604, the flowchart loops to 602. If an appropriate beacon has been found at 604, the flowchart moves to 606, where the discovering device sends a SCAN_REQ packet. At 608, the discovering device receives a SCAN_RSP packet, which provides more information, e.g. details about the AP. Optionally, at 610 and if the received data is encrypted, decrypt the received data in scan response to obtain the SSID and PSK. At 612, the discovering device configures its WiFi™ processor or circuits to associate with the AP WiFi. In some examples, the beacon device transfers to become a WiFi™ AP with the configuration settings provided in the SCAN_RSP message. At 614 the WiFi™ AP of the original beacon device indicates that it has available content. In some examples, this may be displayed to the user of the discovering device. At 616, the user determines whether it wishes to download content. At 616, if the user determines that (s)he does not want to download content, the process ends. However, if the user determines that (s)he does want to download content at 616, the process moves to 618, where the discovering device selects the content to be downloaded via WiFi™.

Figure 7:
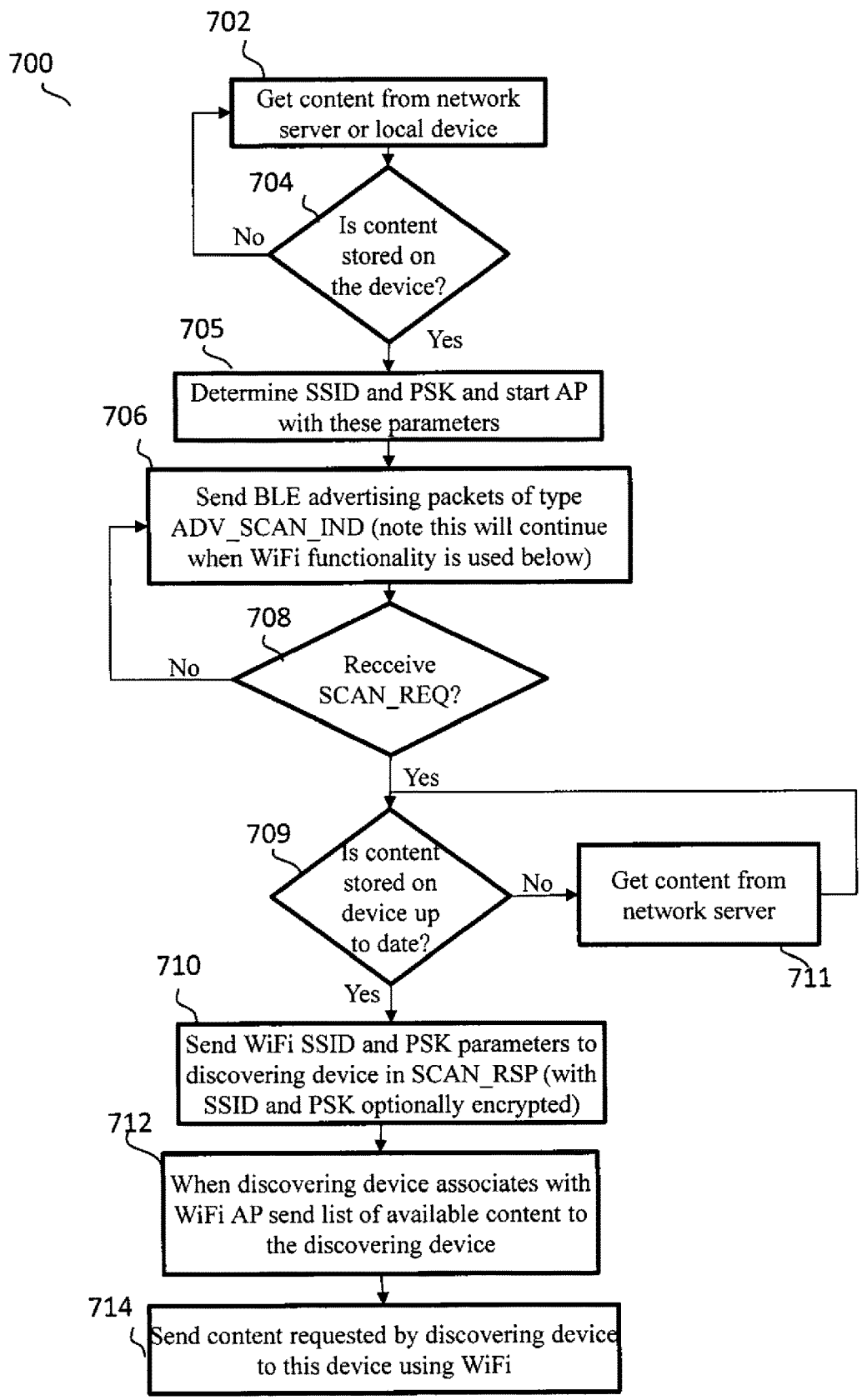
FIG. 7 illustrates an example flowchart of an operation for a beacon device in accordance with some example embodiments of the present invention.

FIG. 7 illustrates an example flowchart 700 of an operation for a beacon device, in accordance with some example embodiments of the present invention. At 702, the beacon device obtains desired content from a network server or local device, and at 704, determines whether it has downloaded and stored all of the desired content. If the desired content is not stored on the device, the process loops to 702 and the beacon device continues to obtain desired content from the network server or local device. However, if at 704 the beacon device determines that the desired content has been downloaded and is stored on the device, the beacon device selects an appropriate WiFi™ SSID and PSK and starts its WiFi™ AP at 705. Subsequently, the beacon device sends BLE advertising packets of type ADV_SCAN_IND at 706. At 708, the beacon device determines whether it has received a SCAN_REQ_message for more information? If at 708, the beacon device determines that it has not received a SCAN_REQ message for more information, the process loops to 706. If at 708, the beacon device determines that it has received a SCAN_REQ message for more information, the process moves to 709, where the beacon tests to see if the content that it has previously stored is up-to-date. The process of checking whether the content is up to date may involve querying the server 240 where the content was originally obtained or associating a timer with the content and if the content has been obtained from server 240 within a defined period then assuming that it is up to date, as would be understood by a skilled person. If the stored content is up-to-date, then the beacon moves onto 710. Otherwise (when the content is not up-to-date) the beacon device moves to 711 and re-downloads the content from the server 240. At step 710 the beacon device sends the SSID and PSK parameters, obtained in 705, to the discovering device in a SCAN_RSP message (with SSID and PSK optionally encrypted). At 712, after the discovering device has associated with the WiFi™ AP of the beacon device, the beacon device sends a list of available content to the discovering device. At 714, the beacon device sends the content requested by the discovering device to this device using WiFi™ communications.

Figure 8:
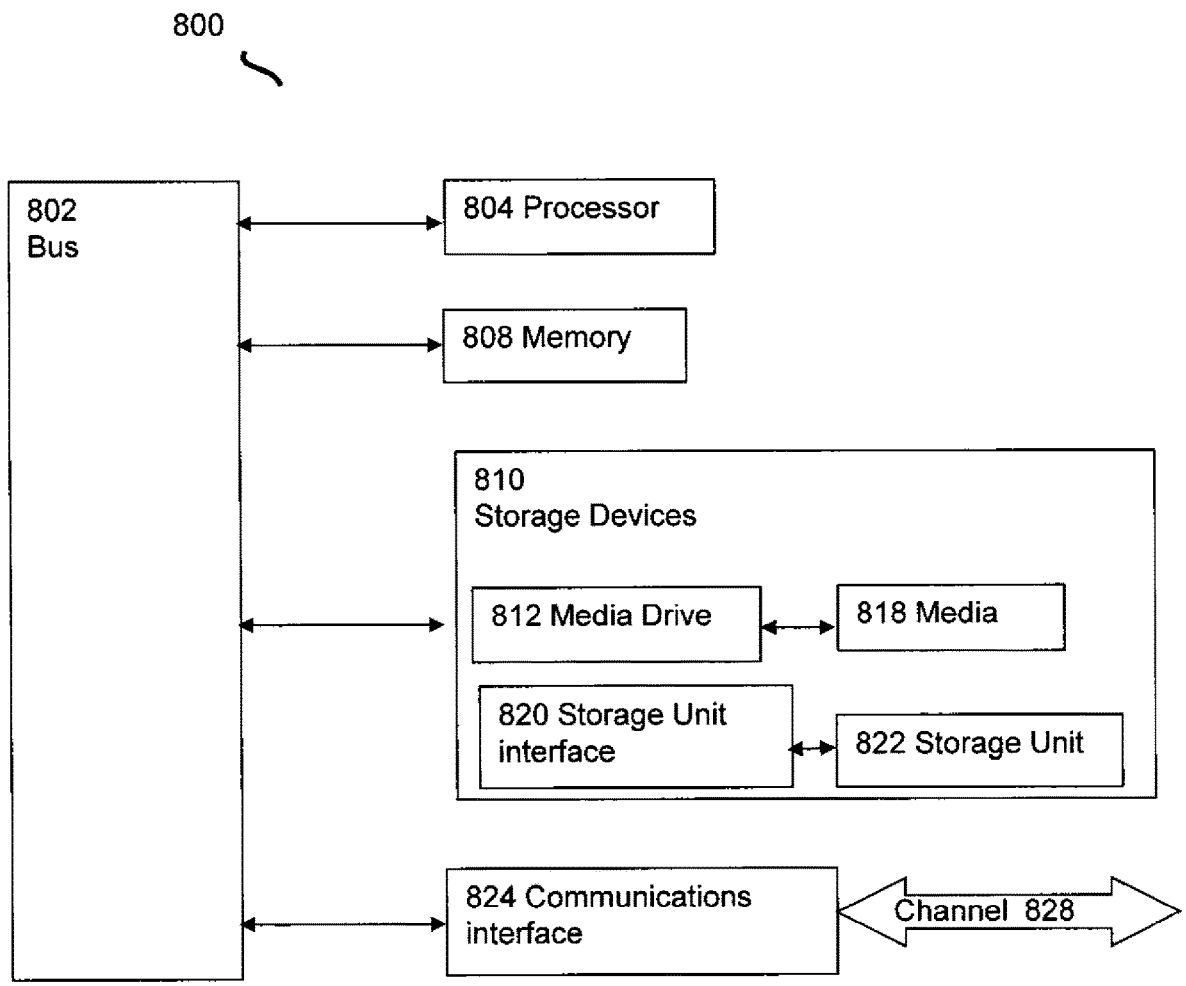
FIG. 8 illustrates a typical computing system that may be employed a wireless communication unit to perform an enforcement role in accordance with some example embodiments of the invention.

Referring now to FIG. 8, there is illustrated a typical computing system 800 that may be employed to implement software controlled switching between a first mode of operation where a backhaul link may be available and a second mode of operation where a backhaul link may not be available in some example embodiments of the invention. Computing systems of this type may be used in wireless communication units. Those skilled in the relevant art will also recognize how to implement the invention using other computer systems or architectures. Computing system 800 may represent, for example, a desktop, laptop or notebook computer, hand-held computing device (PDA, cell phone, palmtop, etc.), mainframe, server, client, or any other type of special or general purpose computing device as may be desirable or appropriate for a given application or environment. Computing system 800 can include one or more processors, such as a processor 804. Processor 804 can be implemented using a general or special-purpose processing engine such as, for example, a microprocessor, microcontroller or other control logic. In this example, processor 804 is connected to a bus 802 or other communications medium.

Computing system 800 can also include a main memory 808, such as random access memory (RAM) or other dynamic memory, for storing information and instructions to be executed by processor 804. Main memory 808 also may be used for storing temporary variables or other intermediate information during execution of instructions to be executed by processor 804. Computing system 800 may likewise include a read only memory (ROM) or other static storage device coupled to bus 802 for storing static information and instructions for processor 804.

The computing system 800 may also include information storage system 810, which may include, for example, a media drive 812 and a removable storage interface 820. The media drive 812 may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media 818 may include, for example, a hard disk, floppy disk, magnetic tape, optical disk, CD or DVD, or other fixed or removable medium that is read by and written to by media drive 812. As these examples illustrate, the storage media 818 may include a computer-readable storage medium having particular computer software or data stored therein.

In alternative embodiments, information storage system 810 may include other similar components for allowing computer programs or other instructions or data to be loaded into computing system 800. Such components may include, for example, a removable storage unit 822 and an interface 820, such as a program cartridge and cartridge interface, a removable memory (for example, a flash memory or other removable memory module) and memory slot, and other removable storage units 822 and interfaces 820 that allow software and data to be transferred from the removable storage unit 818 to computing system 800.

Computing system 800 can also include a communications interface 824. Communications interface 824 can be used to allow software and data to be transferred between computing system 800 and external devices. Examples of communications interface 824 can include a modem, a network interface (such as an Ethernet or other NIC card), a communications port (such as for example, a universal serial bus (USB) port), a PCMCIA slot and card, etc. Software and data transferred via communications interface 824 are in the form of signals which can be electronic, electromagnetic, and optical or other signals capable of being received by communications interface 824. These signals are provided to communications interface 824 via a channel 828. This channel 828 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms 'computer program product', 'computer-readable medium' and the like may be used generally to refer to media such as, for example, memory 808, storage device 818, or storage unit 822. These and other forms of computer-readable media may store one or more instructions for use by processor 804, to cause the processor to perform specified operations. Such instructions, generally referred to as 'computer program code' (which may be grouped in the form of computer programs or other groupings), when executed, enable the computing system 800 to perform functions of embodiments of the present invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 800 using, for example, removable storage drive 822, drive 812 or communications interface 824. The control logic (in this example, software instructions or computer program code), when executed by the processor 804, causes the processor 804 to perform the functions of the invention as described herein.

It will be further appreciated that, for clarity purposes, the described embodiments of the invention with reference to different functional units and processors may be modified or re-configured with any suitable distribution of functionality between different functional units or processors is possible, without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Aspects of the invention may be implemented in any suitable form including hardware, software, firmware or any combination of these. The invention may optionally be implemented, at least partly, as computer software running on one or more data processors and/or digital signal processors. For example, the software may reside on non-transitory computer program product comprising executable program code to increase coverage in a wireless communication system.

Thus, the elements and components of an embodiment of the invention may be physically, functionally and logically implemented in any suitable way. Indeed, the functionality may be implemented in a single unit, in a plurality of units or as part of other functional units. Those skilled in the art will recognize that the functional blocks and/or logic elements herein described may be implemented in an integrated circuit for incorporation into one or more of the communication units.

In a first example of an integrated circuit, the integrated circuit may be suitable for a beacon device for communicating with at least one discovering device, such as integrated circuit 439 from FIG. 4. In this first example, the integrated circuit comprises: at least one first port coupled to a transceiver configured to obtain content from a remote server using a first wireless technology or wireline technology; at least one second port coupled to a second transmitter configured to transmit at least a beacon indicator on a second wireless technology; and coupled to a second receiver configured to receive a first message from the discovering device in response to the beacon indicator on the second wireless technology requesting information relating to the beacon indicator; a controller operably coupled to the second receiver and configured to process the received first message; and in response thereto the controller is configured to transmit a second message via the second transmitter to the discovering device comprising details of how the at least one discovering device is to download the content.

In a second example of an integrated circuit, the integrated circuit, such as integrated circuit 425 from FIG. 4, may be suitable for a wireless communication unit, such as a discovering device, for communicating with at least one beacon device. In this second example, the integrated circuit comprises: at least one first port coupled to a receiver configured to receive at least a beacon indicator on a second wireless technology and coupled to a transmitter configured to transmit a first message to the beacon device in response to the received beacon indicator on the second wireless technology requesting information relating to the beacon indicator; a controller operably coupled to the receiver and configured to process a received second message from the beacon device comprising details of how the content is to be downloaded; and at least one second port coupled to a second receiver that supports a first wireless technology; wherein the controller is configured to associate itself with an access point, AP, of the beacon device in response to the second message and obtain the content from the AP using the first wireless technology.

Furthermore, it is intended that boundaries between logic blocks are merely illustrative and that alternative embodiments may merge logic blocks or circuit elements or impose an alternate composition of functionality upon various logic blocks or circuit elements. It is further intended that the architectures depicted herein are merely exemplary, and that in fact many other architectures can be implemented that achieve the same functionality.

Although the present invention has been described in connection with some example embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

What is claimed is:

1. A beacon device for communicating with at least one discovering device, the beacon device comprising:
a transceiver comprising a first transmitter and a first receiver that is configured to obtain content from a remote server using a first wireless technology or a wireline technology;
memory, or a port for coupling to external memory, wherein the memory or external memory is configured to store the content obtained from the remote server;
a second transmitter configured to transmit a Bluetooth™ low energy, BLE, advertising message comprising at least a beacon indicator to the at least one discovering device on a second technology wherein the beacon indicator indicates to the at least one discovering device content that is available from the remote server and that the beacon device has obtained and stored locally the same content;
a second receiver configured to receive a first message from the at least one discovering device on the second technology in response to the transmitted BLE advertising message comprising the beacon indicator, wherein the first message requests information relating to a third technology to use to obtain locally the same content direct from the beacon device wherein the third technology is WiFi™;
a controller operably coupled to the second receiver and the second transmitter and configured to process the received first message and configured to identify whether the content stored locally in the memory or external memory is the same as content that the at least one discovering device would have obtained from the remote server using legacy functionality; and
wherein the second transmitter transmits a second BLE message on the second technology to the at least one discovering device only in response to the received first message and that the controller has identified that the content stored locally in the memory or external memory is the same as the content that the at least one discovering device would have obtained from the remote server using legacy functionality, where the second BLE message is indicative of the same content being stored locally to the beacon device and the second BLE message comprises details of how the at least one discovering device is to download the same content directly from the beacon device using the third WiFi™ technology.

2. The beacon device of claim 1 wherein the beacon device comprises an 802.11 access point, AP, or WiFi™ AP, and the second BLE message comprises at least an identifier of the 802.11 AP or WiFi™ AP to enable the at least one discovering device to associate with the 802.11 AP or WiFi™ AP.

3. The beacon device of claim 2 wherein the second BLE message comprises a service set identifier, SSID, of the 802.11 AP or WiFi™ AP and a pre-shared key, PSK, for a WiFi™ download.

4. The beacon device of claim 1 wherein the beacon indicator is a uniform resource locator, URL, and the first message is a google Eddystone™ beacon.

5. The beacon device of claim 3 wherein the controller contemporaneously starts a wireless circuit of the 802.11 AP or WiFi™ AP following a response from the at least one discovering device to the second BLE message.

6. The beacon device of claim 1 wherein the beacon device is configured to employ a two-way information exchange process with the at least one discovering device via 802.11 WiFi™ functionality.

7. The beacon device of claim 3 wherein the beacon device is configured to employ a two-way information exchange process with the at least one discovering device via 802.11 WiFi™ functionality and wherein the two-way information exchange comprises service discovery functionality when the at least one discovering device has been informed of the service set identifier, SSID, of the 802.11 AP.

8. The beacon device of claim 6 wherein the two-way information exchange provides more information regarding the same content than is available from the beacon device.

9. The beacon device of claim 1 wherein the beacon device comprises a management access point, AP, circuit configured to manage uploading of data to the beacon device for storage in the memory or coupled external memory.

10. The beacon device of claim 1 wherein, the received first message is a scan request message and the second BLE message is a BLE scan response message.

11. The beacon device of claim 1 further comprising an encryption circuit coupled to the controller and configured to encrypt the second BLE message.

12. An integrated circuit for a beacon device for communicating with at least one discovering device, the integrated device comprising:
at least one first port couplable to a transceiver comprising a first transmitter and a first receiver configured to obtain content from a remote server using a first wireless technology or wireline technology;
memory, or a port for coupling to external memory, wherein the memory or external memory is configured to store the content obtained from the remote server;
at least one second port coupled to a second transmitter configured to transmit a Bluetooth™ low energy, BLE, advertising message comprising at least a beacon indicator to the at least one discovering device on a second technology wherein the beacon indicator indicates to the at least one discovering device content that is available from the remote server and that the beacon device has obtained and stored locally the same content;
a second receiver configured to receive a first message from the at least one discovering device on the second technology in response to the transmitted BLE advertising message comprising the beacon indicator, wherein the first message requests information relating to a third technology to use to obtain locally the same content direct from the beacon device wherein the third technology is WiFi;
a controller operably coupled to the second receiver and the second transmitter and configured to process the received first message and configured to identify whether the content stored locally in the memory or external memory is the same as content that the at least one discovering device would have obtained from the remote server using legacy functionality; and
wherein the second transmitter transmits a second BLE message on the second technology to the at least one discovering device only in response to the received first message and that the controller has identified that the content stored locally in the memory or external memory is the same as the content that the at least one discovering device would have obtained from the remote server using legacy functionality, where the second BLE message is indicative of the same content being stored locally to the beacon device and the second BLE message comprises details of how the at least one discovering device is to download the same content directly from the beacon device using the third WiFi™ technology.

13. A method for a beacon device to communicate with at least one discovering device, the method comprising, at the beacon device:
obtaining and storing content, received from a remote server using a first wireless technology or wireline technology, in memory in the beacon device or external memory coupled to a port of the beacon device;
transmitting a Bluetooth™ low energy, BLE, advertising message comprising at least a beacon indicator to the at least one discovering device on a second technology wherein the beacon indicator indicates to the at least one discovering device content that is available from the remote server and that the beacon device has obtained and stored locally the same content;
receiving a first message from the at least one discovering device on the second technology in response to the transmitted BLE advertising message comprising the beacon indicator, wherein the first message requests information relating to a third technology to use to obtain locally the same content direct from the beacon device wherein the third technology is WiFi;
processing the received first message and identifying whether the content stored locally in the memory or external memory is the same as content that the at least one discovering device would have obtained from the remote server using legacy functionality; and
transmitting a second BLE message to the at least one discovering device only in response to the received first message and identifying that the content stored locally in the memory or external memory is the same as the content that the at least one discovering device would have obtained from the remote server using legacy functionality, where the second BLE message is indicative of the same content being stored locally to the beacon device and the second BLE message comprises details of how the at least one discovering device is to download the same content directly from the beacon device using the third WiFi™ technology.

14. A wireless communication unit for communicating with a beacon device, the wireless communication unit comprising:
   a first receiver configured to receive on a second technology and process a Bluetooth™ low energy, BLE, advertising message comprising at least a beacon indicator from the beacon device, wherein the beacon indicator indicates to the wireless communication unit that content is available from a remote server using a first wireless technology or wireline technology;
   a transmitter configured to transmit a first message to the beacon device on the second technology in response to the received BLE advertising message comprising the beacon indicator, wherein the first message requests information relating to a third technology to use to obtain locally the same content direct from the beacon device wherein the third technology is WiFi™;
   wherein the first receiver is configured to receive a second BLE message from the beacon device only in response to the first message and the beacon device having identified that the content stored locally in the memory or external memory is the same as the content that the at least one discovering device would have obtained from the remote server using legacy functionality;
   a controller operably coupled to the first receiver and configured to process the received second BLE message wherein the second BLE message is indicative of the same content being stored locally to the beacon device and the second BLE message comprises details of how the same content is to be downloaded directly from the beacon device using the third WiFi™ technology; and
   a second receiver that supports the first wireless technology or wireline technology;
   wherein the controller is configured to associate itself with an access point, AP, of the beacon device in response to the second BLE message and obtain the same content direct from the AP using the third WiFi™ technology.

15. The wireless communication unit of claim 14 wherein the second BLE message detailing how the same content is to be downloaded comprises a service set identifier, SSID, of the AP and a pre-shared key, PSK, for a WiFi™ download.

16. The wireless communication unit of claim 14 wherein the first receiver is configured to receive both the BLE advertising message comprising at least the beacon indicator and advertised content on the second technology.

17. An integrated circuit for a wireless communication unit for communicating with a beacon device, the integrated device comprising:
   at least one first port coupled to a receiver configured to receive on a second technology and process a Bluetooth™ low energy, BLE, advertising message comprising at least a beacon indicator from the beacon device, wherein the beacon indicator indicates to the wireless communication unit that content is available from a remote server using a first wireless technology or wireline technology; and the at least one first port is coupled to a transmitter configured to transmit a first message to the beacon device on the second technology in response to the received BLE advertising message comprising the beacon indicator, wherein the first message requests information relating to a third technology to use to obtain locally the same content direct from the beacon device wherein the third technology is WiFi™;
   a controller operably coupled to the receiver and configured to process a received second BLE message from the beacon device only in response to the first message wherein the second BLE message is indicative of the beacon device having identified that the content stored locally in memory or external memory is the same content that the at least one discovering device would have obtained from the remote server using legacy functionality and the second BLE message comprises details of how the same content is to be downloaded directly from the beacon device; and at least one second port coupled to a second receiver that supports a first wireless technology;
   wherein the controller is configured to associate itself with an access point, AP, of the beacon device in response to the second BLE message and obtain the same content direct from the AP using the third WiFi™ technology.

18. A method for a wireless communication unit to communicate with a beacon device, the method comprising, at the wireless communication unit:
   receiving on a second technology and processing a Bluetooth™ low energy, BLE, advertising message comprising at least a beacon indicator from the beacon device, wherein the beacon indicator indicates to the wireless communication unit that content is available from a remote server using a first wireless technology or wireline technology;
   transmitting a first message to the beacon device on the second technology in response to the received BLE advertising-message comprising the beacon indicator, wherein the first message requests information relating to a third technology to use to obtain locally the same content direct from the beacon device wherein the third technology is WiFi™;
   receiving a second BLE message from the beacon device only in response to the first message and the beacon device having identified that the content stored locally in the memory or external memory is the same as the content that the at least one discovering device would have obtained from the remote server using legacy functionality;
   processing the received second BLE message, wherein the second BLE message is indicative of the same content being stored locally to the beacon device and the second BLE message comprises details of how the same content is to be downloaded directly from the beacon device;
   associating the wireless communication unit with an access point, AP, of the beacon device in response to the second BLE message; and
   obtaining the same content direct from the AP using a transceiver that supports the third WiFi™ technology.

19. A wireless communication system that supports multiple technologies and comprises:
   at least one discovering device;
   a beacon device for communicating with the at least one discovering device, the beacon device comprising:
      a transceiver comprising a first transmitter and a first receiver that is configured to obtain content from a remote server using a first wireless technology or a wireline technology;

memory, or a port for coupling to external memory, wherein the memory or external memory is configured to store the content obtained from the remote server;

a second transmitter configured to transmit at least a Bluetooth™ low energy, BLE, advertising message comprising a beacon indicator to the at least one discovering device on a second technology wherein the beacon indicator indicates to the at least one discovering device that content is available from the-remote server and that the beacon device has obtained and stored locally the same content;

a second receiver configured to receive a first message from the at least one discovering device on the second technology in response to the transmitted BLE advertising message comprising the beacon indicator, wherein the first message requests information relating to a third technology to use to obtain locally the same content direct from the beacon device wherein the third technology is WiFi™;

a controller operably coupled to the second receiver and the second transmitter and configured to process the received first message and configured to identify whether the content stored locally in the memory or external memory is the same as content that the at least one discovering device would have obtained from the remote server using legacy functionality; and wherein the second transmitter transmits a second BLE message to the at least one discovering device only in response to the received first message on the second technology and that the controller has identified in the second BLE message that the content stored locally in the memory or external memory to the beacon device is the same content that the at least one discovering device would have obtained from the remote server using legacy functionality and the second BLE message comprises details of how the at least one discovering device is to download the same content directly from the beacon device using the third WiFi™ technology.

* * * * *